July 7, 1931. T. R. SNYDER 1,813,262
MECHANICAL STOKER
Filed Jan. 17, 1929
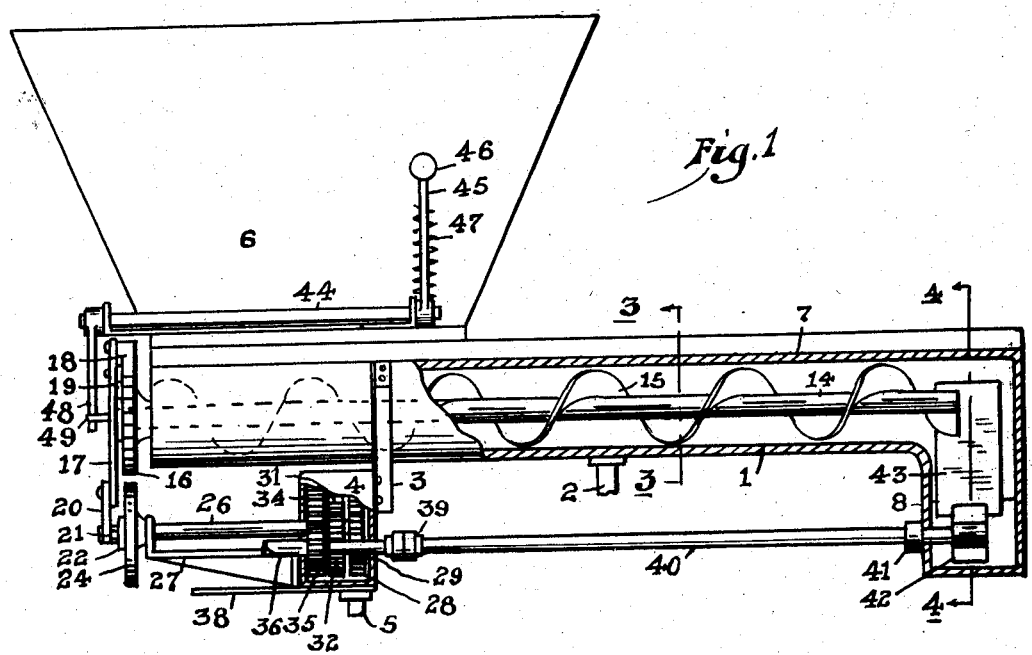
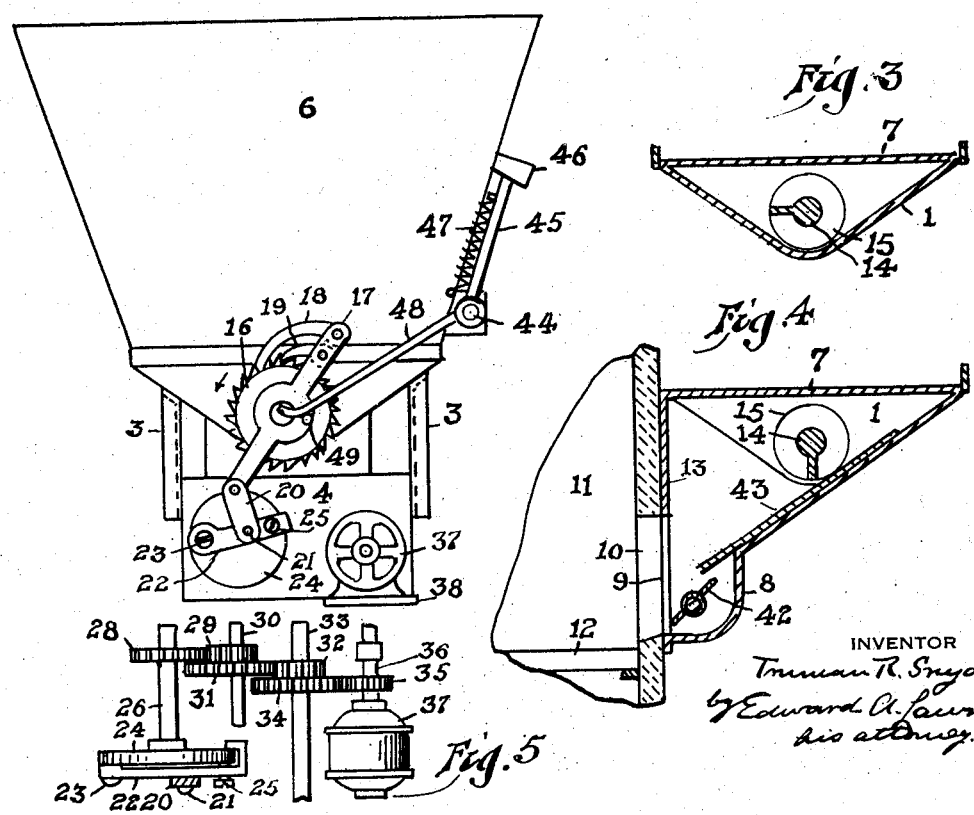
INVENTOR
Truman R. Snyder,
by Edward A. Laurence
his attorney.

Patented July 7, 1931

1,813,262

UNITED STATES PATENT OFFICE

TRUMAN R. SNYDER, OF MEADVILLE, PENNSYLVANIA ASSIGNOR TO FREDERICK C. HINKEL, OF ROSS TOWNSHIP, ALLEGHENY COUNTY, PENNSYLVANIA

MECHANICAL STOKER

Application filed January 17, 1929. Serial No. 333,087.

The object which I have in view is the provision of an inexpensive, efficient and compact mechanical stoker which may be put into practical use for firing boiler and other heating furnaces.

More especially my invention is designed for use in connection with domestic heating plants and heating plants for florists' greenhouses and other like uses.

Generally speaking my improved stoker comprises a supply container, such as a hopper, a horizontally disposed trough having one end connected to the hopper and having its other end connected to a receiving compartment, a conveying worm working in said trough, and an expelling member, specifically a revolving paddle, which ejects the fuel from the receiving compartment into the fire box of the boiler or furnace.

I provide means for insuring a continuous supply of fuel to the conveyer.

Other novel features of construction, of arrangement, and of combination of parts will appear from the following description.

In the accompanying drawings, wherein I have illustrated an embodiment of the principles of my invention, which I have found to be practical, Fig. 1 is a side elevation of the stoker, the conveyer trough and the ejector chamber being cut away in vertical section to show parts, and the motor being also omitted.

Fig. 2 is an enlarged front end view looking from the left in Fig. 1.

Fig. 3 is a sectional view taken along the line 3—3 in Fig. 1.

Fig. 4 is a sectional view taken along the line 4—4 in Fig. 1.

Fig. 5 is a diagrammatic view in plan showing the gear drive.

Referring to the drawings, 1 represents a horizontally disposed conveyer trough which is preferably of substantially the characteristic cross sectional shape shown in Fig. 3.

Intermediate of its length the trough is supported by the leg 2 while the front end of the trough is shown supported by the struts 3 extending upwardly from the gear box 4 which is in turn supported by the leg 5.

The front or receiving end of the trough, the left end in Fig. 1, has superimposed thereon the feed hopper 6 whose throat is open to the trough.

The remainder of the trough is provided with a cover 7, and ends of the trough are closed.

Beneath the discharge end of the trough is positioned the ejector box 8 whose top is open to the trough and whose side is provided with a doorway 9, which when the stoker is in place, as illustrated in Fig. 4, registers with the fuel door 10 of the furnace 11 whose grate bars are indicated at 12. The adjacent side wall 13 of the trough and the box is preferably made vertical to fit against the front of the furnace.

14 represents a shaft extending through the trough 1 and having its front end protruding through a bearing in the end wall of the trough. A worm 15 is mounted on said shaft extending from beneath the hopper 6 to above the box 8.

It is apparent that the worm floats in the trough, its axial shaft being supported by bearings only at its front end.

The protruding end of the shaft 14 has mounted thereon the toothed ratchet wheel 16 and outside of said wheel, a lever 17 is loosely mounted intermediate of its ends on said shaft.

The upper end of the lever 17 carries the pivotally mounted pawls 18 and 19 which are held, as by gravity, in engagement with the teeth of the ratchet wheel.

The lower end of the lever 17 is connected by the link 20 with a crank pin 21 mounted on a bar 22 intermediate of the length of the bar.

One end of the bar 22 is pivotally mounted, as on the screw stud 23, on the face of a disk 24 and at a point adjacent to the edge of the disk. The other end of the bar 22 is bent back on itself to form a loop which encompasses the edge of the disk 24, and 25 represents a set screw screwed into a threaded hole in the bar 22 and adapted to be screwed up tightly against the face of the disk to fix the bar relative to the disk.

Assuming the disk 24 to be rotated, it is evident that by shifting the bar 22 relative to the disk the throw of the lever 17 may be varied, and thus the arc of the movement intermittently imparted to the worm conveyer 15 may be shortened or lengthened.

The disk 24 is mounted on the end of a shaft 26 which has its outer end journaled in a bracket 27 extending from the gear box 4 while the inner end of the shaft extends into the gear box and has mounted thereon the gear wheel 28 meshing with a pinion 29 mounted on a counter shaft 30 which also carries a gear 31 meshing with a pinion 32 on a countershaft 33 bearing also a gear 34 meshing with a pinion 35 on the shaft 36 of the motor 37. The motor may be mounted on a shelf 38 extending forwardly from the gear box 4.

It is obvious that the conveyer is intermittently rotated counterclockwise in Fig. 1, and at a greatly reduced speed compared to the motor speed and that the arc of the movement of the conveyer may be adjusted by the shifting of the bar 22 on the disk 24.

The motor shaft 36 is coupled as at 39 to the horizontally disposed shaft 40 whose rear end extends through a journal 41 on the front wall of the box 8, and within said box a rotary paddle wheel 42 is mounted on the shaft 40. This paddle wheel rotates counterclockwise, in Fig. 4.

A deflector plate 43 mounted in the end of the trough 1 directs the coal, delivered by the conveyer worm, onto the paddle wheel 42 which in turn, owing to its relatively high speed of rotation, ejects the coal in the form of a series of sheets onto the fire bed over which the fuel is widely distributed.

To prevent the fuel from packing and lodging in the hopper, I provide hammering or jarring means.

Thus 44 represents a horizontally disposed shaft journaled in bearings carried by the lower exterior side wall of the hopper, and 45 represents an arm fixed on the shaft and disposed radially thereof. The outer end of the arm 45 carries a hammer or head 46 which may be provided with a rubber or other resilient impact surface. The hammer is resiliently held against the wall of the hopper as by the helical spring 47.

The front end of the shaft 44 protrudes beyond the hopper and has fixed thereto the radially disposed lever 48 whose lower end is held against the pin 49 by the action of the spring 47.

The pin 49 is mounted on the hub of the lever 17 but eccentrically to the axis of the movements of the lever 17, so that the oscillation of the lever 17 causes the hammer to intermittently tap against the side of the hopper.

It is evident that the intermittent rotary movements of the conveyer worm will feed the fuel forwardly at the speed to which it may be adjusted by means of the movable bar 22 on the face of the disk 24.

The fuel is delivered by the worm to the paddle wheel 42 which, owing to its relatively high speed of rotation, spreads the fuel over the fuel bed in the furnace in the form of a series of sheets.

The hammer prevents the fuel packing or clogging in the hopper and thus insures a continuous supply to the worm.

Any character of fuel, either slack or up to inch and a half lumps, may be used with success. I have used slack mixed with lumps up to the size above mentioned with great success.

There is a marked advantage in employing a floating conveyer in the trough or, in other words, a conveyer not confined to a fixed axis of rotation at its delivery end, as the conveyer is thus free to ride up over lumps which might otherwise jam under the worm and thus interfere with its proper feeding function.

My improved stoker is a compact mechanism which occupies but little space and thus can be installed in connection with any boiler or other heating furnace. It can be made and sold at a much lower cost than that of other types of stokers and thus is available for use where a greater expense would not be warranted.

The even distribution of the fuel over the fire bed promotes complete combustion of the fuel and also prevents the emission of smoke. By the use of my improved stoker I provide the boiler or other furnace with a practical smoke consumer without extra expense, and thus slack and small coal may be used successfully and conveniently.

What I desire to claim is:—

1. In a mechanical stoker, the combination of a horizontally disposed conveyer trough, a feed hopper at one end of said trough, a shaft extending through said trough, a bearing for said shaft at the feed end of the trough, the other end of said shaft being free for movement transversely to the axis of the trough, a conveyer worm carried by said shaft, an ejector box at the other end of the trough and into which the fuel is delivered by the conveyer worm, said box being provided with a doorway, and an ejector in said box to discharge the fuel through said doorway.

2. In a mechanical stoker, the combination of a horizontally disposed conveyer trough, a feed hopper at one end of said trough, a shaft extending through said trough, a bearing for said shaft at the feed end of the trough, the other end of said shaft being free for movement transversely to the axis of the trough, a conveyer worm carried by said shaft, an ejector box at the other end of the trough and into which the fuel is delivered by the conveyer worm, said box being provided with a doorway, and a rotary paddle ejector in said box to discharge the fuel through said doorway.

3. In a mechanical stoker, the combination of a horizontally disposed trough having a substantially V-shaped cross-section, a gravity feed hopper above one end of the trough, an ejector box at the other end of the trough, a worm conveyer in said trough arranged to deliver the fuel from the hopper to the box, a rotary ejector in said box arranged to discharge the fuel into the furnace, a motor, and means whereby the conveyer is driven at low speed and the ejector at high speed by said motor.

4. In a mechanical stoker, the combination of a horizontally disposed trough, having a substantially V-shaped cross-section, a gravity feed hopper above one end of the trough, an ejector box at the other end of the trough, a worm conveyer in said trough arranged to deliver the fuel from the hopper to the box, a rotary paddle ejector in said box arranged to discharge the fuel into the furnace, a motor, and means whereby the conveyer is driven at low speed and the ejector at high speed by said motor.

5. In a mechanical stoker, the combination of a horizontally disposed trough having a substantially V-shaped cross-section, a gravity feed hopper above one end of the trough and an ejector box at the other end of the trough, a conveyer worm working in the trough to deliver the fuel from the hopper to the box, a rotary ejector in said box to discharge the fuel into the furnace, a motor, means for imparting an intermittent rotary movement to the conveyer worm from the motor, and means for continuously rotating the ejector from the motor.

6. In a mechanical stoker, the combination of a horizontally disposed trough, a feed hopper at one end of the trough, a conveyer worm working in said trough, means for imparting an intermittent rotary movement to the conveyer worm, means for varying the arc of said movement, and means whereby the delivery end of the worm may move transversely to the axis of the trough.

Signed at Ross Township, Allegheny County, Pa., this 12th day of January, 1929.

TRUMAN R. SNYDER.